United States Patent
Deng et al.

(10) Patent No.: US 8,827,350 B1
(45) Date of Patent: Sep. 9, 2014

(54) SIDE IMPACT UPPER LEG PUSHER

(71) Applicant: Ford Global Technologies, LLC, Dearborn, MI (US)

(72) Inventors: Zhibing Deng, Northville, MI (US); Shahram Haghi, Waterford, MI (US); Tahmidur Rahman, Canton, MI (US); Satyanarayana Raju Vemulapati, Westland, MI (US); Paul Schryer, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/798,234

(22) Filed: Mar. 13, 2013

(51) Int. Cl.
*B60J 5/00* (2006.01)
*B60J 5/04* (2006.01)

(52) U.S. Cl.
CPC ..................... *B60J 5/0461* (2013.01)
USPC ...................................... 296/146.6

(58) Field of Classification Search
CPC .................................................... B62D 21/157
USPC ............... 296/146.6, 187.05, 187.12, 203.03
See application file for complete search history.

(56) References Cited

U.S. PATENT DOCUMENTS

| | | | |
|---|---|---|---|
| 5,124,186 A * | 6/1992 | Wycech | 428/35.8 |
| 6,955,391 B1 | 10/2005 | Peng | |
| 7,014,249 B2 | 3/2006 | Karuppaswamy et al. | |
| 7,334,813 B2 | 2/2008 | Mellor | |
| 7,503,621 B2 * | 3/2009 | Mani | 296/187.05 |
| 7,618,057 B2 | 11/2009 | Pinsenschaum et al. | |
| 7,726,727 B2 | 6/2010 | Bhattacharjee et al. | |
| 7,832,781 B2 * | 11/2010 | Deng et al. | 296/37.13 |
| 7,992,920 B2 * | 8/2011 | Deng et al. | 296/146.6 |
| 8,029,041 B2 * | 10/2011 | Hall et al. | 296/146.6 |
| 8,152,218 B2 * | 4/2012 | Hall et al. | 296/146.6 |
| 2008/0114516 A1 | 5/2008 | Jackson et al. | |
| 2009/0284041 A1 | 11/2009 | Hall et al. | |

FOREIGN PATENT DOCUMENTS

KR 20070105736 A 10/2007

* cited by examiner

*Primary Examiner* — Lori Lyjak
(74) *Attorney, Agent, or Firm* — Frank A. MacKenzie; Brooks Kushman P.C.

(57) ABSTRACT

Side structure for a motor vehicle includes an upper leg pusher located immediately outboard of a panel adjacent to a seat and inboard of a structural member such as a side impact beam. The upper leg pusher has a lower-stiffness portion adjacent to the rear section of the panel and aligned with an upper thigh position of the seat, and a higher-stiffness portion adjacent to the forward section of the panel, which is offset outboard relative to the rear section. When the structural component is urged inboard during a side impact event, the higher-stiffness portion of the pusher begins to urge the forward panel section inboard before the lower stiffness portion begins to urge the rear panel section inboard. The rear panel section may be located below an arm rest of a door, and the forward panel section may be forms a recessed surface above a storage pocket.

20 Claims, 3 Drawing Sheets

SIDE IMPACT UPPER LEG PUSHER

TECHNICAL FIELD

The present invention relates to occupant protection systems for motor vehicles, and more specifically to an upper leg pusher to reduce injuries to the pelvis during a side impact.

BACKGROUND

It is known to employ a pelvis-pusher installed in a door or body side panel immediately outboard of a seat to reduce injury to a seated occupant during a side impact event. Pelvis-pushers have typically taken the form of a relatively stiff, unyielding block installed in the door or side panel to fill what would otherwise be empty "crush space" so as to contact the outboard side of the occupant's pelvis earlier during a side impact event. This contact loads the pelvis and pushes the occupant inwardly or inboard relative to the vehicle as a whole.

To optimize injury protection, the pelvis-pusher should have a stiffness that is compatible with the occupant pelvis. Since protection must be provided for occupants of a wide range of sizes and weights, this has been addressed by assuming the occupant is a $50^{th}$ percentile adult (based on size/weight). For an occupant of smaller/lighter stature, however, a pelvis-pusher designed for the $50^{th}$ percentile adult may be too stiff for optimum injury prevention.

To provide optimum protection for a $5^{th}$ percentile occupant generally requires a softer (less stiff) pelvis-pusher to reduce the likelihood of damaging the pelvis. When such a less-stiff pusher is used, the shock-absorption distance must be increased to achieve sufficient movement of the occupant's lower torso away from the impact zone, with a corresponding decrease in the width available in the seating area.

SUMMARY

In a first disclosed embodiment, structure for a passenger-carrying vehicle comprises a panel positioned outboard of a seat in a substantially vertical orientation, a structural component outboard of the panel, and a pusher between the structural component and the panel. The pusher has a lower-stiffness portion adjacent to a first panel location and a higher-stiffness portion adjacent to a second panel location. The first location of the panel is disposed further inboard than the second location of the panel. This places the lower-stiffness portion of the pusher more inboard, closer to an occupant of the seat, and the higher-stiffness portion more outboard, farther from the occupant. When the structural component is urged inboard during a side impact event, the higher-stiffness portion begins to urge the second panel location inboard before (earlier in the event than) the lower stiffness portion begins to urge the first panel location inboard.

In a further disclosed embodiment, the first panel location is outboard of an upper thigh position of the seat, and the second panel location is forward of the first location. This places the pusher alongside an upper thigh of the occupant, so that during a side impact it begins to push against the upper thigh relatively early in the event.

In a further disclosed embodiment, the panel comprises a storage pocket adjacent a lower edge thereof and an armrest, and the second panel location forms a recessed surface above the storage pocket and the first panel location is below the arm rest.

In a further disclosed embodiment, a motor vehicle side structure comprises a panel for positioning adjacent to a seat with a rear section of the panel aligned with an upper thigh position of the seat and a forward section of the panel offset outboard relative to the rear section, a structural component outboard of the panel, and a pusher between the structural component and the panel and having a lower-stiffness portion adjacent to the rear section and a higher-stiffness portion adjacent to the forward section.

In a further disclosed embodiment, the pusher comprises a reaction surface adjacent to the structural component, a first flange in planar contact with an outboard surface of the rear section, a first pusher wall extending between the outboard surface and the first flange, a second flange in planar contact with an outboard surface of the forward section, and a second pusher wall extending between the outboard surface and the second flange, the second pusher wall being less stiff than the first pusher wall.

In a further disclosed embodiment, a door for a motor vehicle comprises a panel adapted for positioning outboard of a seat with a rear section of the panel directly outboard of an upper thigh position of the seat and a forward section of the panel further outboard than the rear section, and a pusher outboard of the panel and having a relatively low stiffness adjacent to the rear section and a relatively high stiffness adjacent to the forward section.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
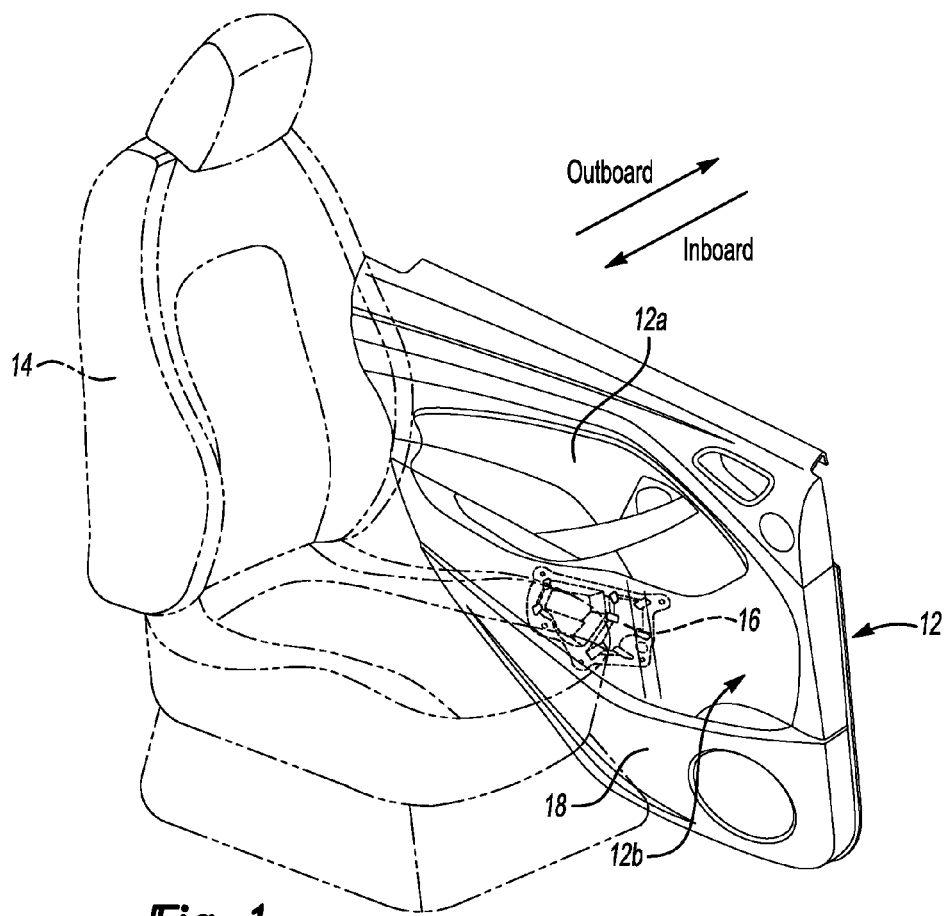
FIG. 1 is a partial view of a motor vehicle side body panel having an upper thigh pusher.

Referring to FIG. 1, a portion of motor vehicle body side structure 12 is oriented vertically and immediately outboard of an occupant seat 14 (shown in phantom lines). Throughout this disclosure, the terms "inboard" and "outboard" are with reference to a longitudinal centerline of the vehicle. The terms "vertical" and "vertically" as used herein (including in the claims) is meant to describe an orientation that forms a lateral surface of the vehicle, and therefore is not limited to a precisely vertical orientation. Motor vehicle body side structure 12 is illustrated as a door having an armrest 12*a* at an appropriate height relative to seat 14 and a storage pocket 12*b* at the forward lower portion. The structure may, however, be any type of fixed or movable body side structure located outboard of a seat or seating position.

Figure 2:
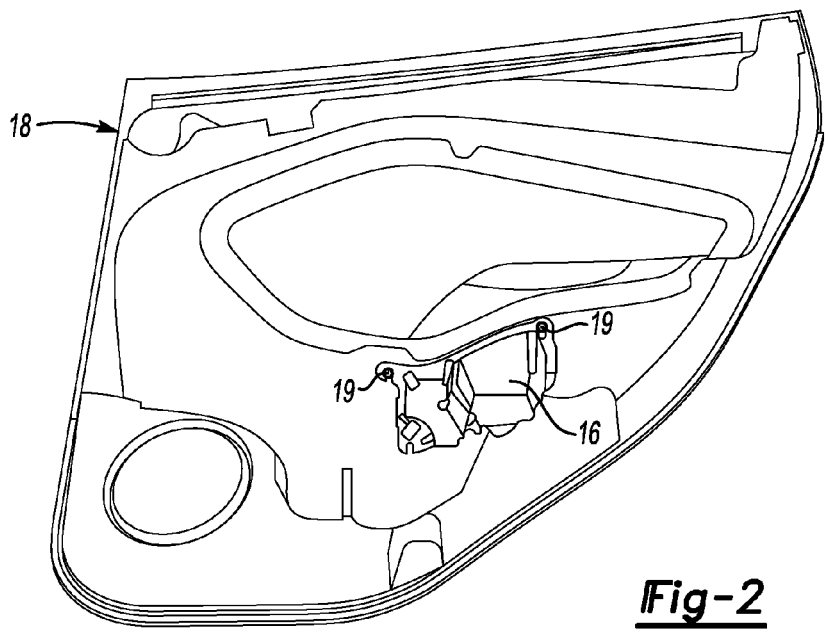
FIG. 2 is a view of the outboard surface of a door trim panel showing the upper thigh pusher.

Body side structure 12 comprises an interior panel 18 immediately adjacent to seat 14. Interior panel 18 is that portion of body side structure forming the surface visible to a vehicle occupant, and is sometimes referred to as a trim panel. It may comprise any number of separate components, but for simplicity will be described as a single component. An upper leg pusher 16 is located within body side structure 12 immediately outboard of interior panel 18, as best seen in FIG. 2. Upper leg pusher 16 may be attached to the back (outboard) surface of panel 18 by any appropriate type of fastening means, such as push-in fasteners 19.

Figure 3:
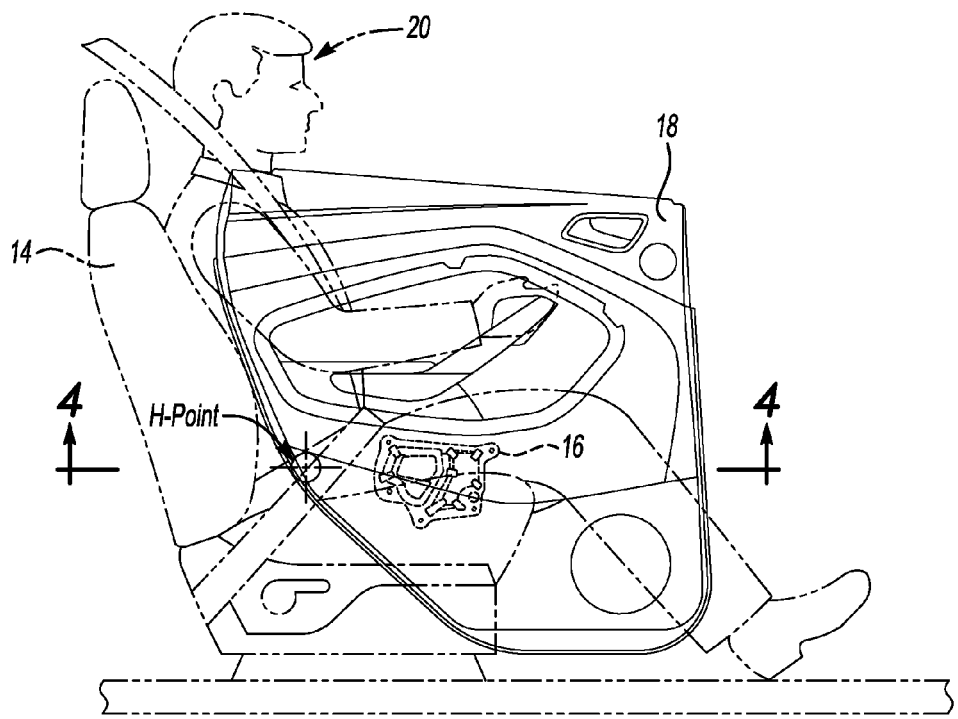
FIG. 3 is a schematic view of a side body panel and thigh pusher showing alignment with a small occupant.

As best seen in FIG. 3, upper leg pusher 16 is located in horizontal and longitudinal alignment with an upper thigh area of a seat occupant 20. This upper thigh area is located somewhat forward of the H-point of the seating position. A pelvis-pusher block 21 of the general type known in the prior art may be located in body side structure 12 in alignment with the H-point, so as to function in the well-known manner during a side impact event.

Figure 4:
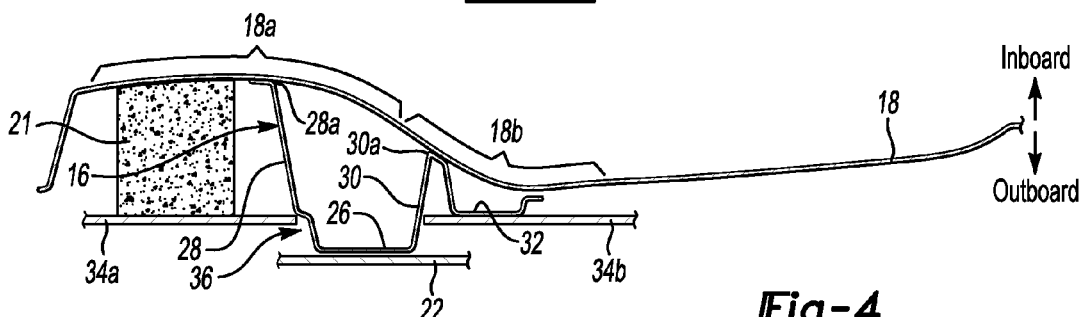
FIG. 4 is a cross-sectional view taken along line 4-4 of FIG. 1 in a pre-impact condition.

As best seen in the cross-sectional view of FIG. 4, body side structure 12 further comprises at least one structural component 22 behind (outboard of) and spaced from interior panel 18. FIG. 4 depicts structural component 22 as a thin, plate-like element but it may be any load-bearing component within side structure 12, such as a portion of a side impact beam. Side impact beams may be of any cross-section necessary to provide adequate strength and protection against intrusion during a side impact event, while maintaining relatively light weight, as is well known in the art.

Upper leg pusher 16 is disposed between interior panel 18 and structural component 22 and preferably completely fills any existing lateral space between those components.

For purposes of description, interior panel 18 may be divided into a first or rear portion 18a and a second or forward portion 18b. Rear portion 18a is positioned relatively far inboard and therefore closer to seat 14, while forward portion 18b is positioned relatively farther outboard and therefore farther from the seat. In the embodiment depicted, forward portion 18b forms a recessed area above storage pocket 12b (see FIG. 1), and rear portion 18a is immediately below arm rest 12a.

Referring again to FIG. 4, upper leg pusher 16 generally comprises a reaction surface 26 located adjacent to the surface of structural component 22 and first and second pusher walls 28, 30 respectively. First pusher wall 28 extends inboard from a rear portion of reaction surface 26 such that an inboard end 28a is adjacent to a relatively inboard location of first panel portion 18a. Second pusher wall 30 extends inboard from a forward portion of reaction surface 26 such that an inboard end 30a is adjacent to a location on panel portion 18b. The location of second pusher wall inboard end 30a is farther outboard than the location of first pusher wall inboard end 28a. Inboard ends 28a, 30a of the pusher walls may be flat, flange-like surfaces to provide a desired area of contact surface with interior panel 18.

In the FIG. 4 embodiment, side body panel 12 further comprises at least one second structural component 34a, 34b disposed inboard of structural component 22. An opening, gap, or window 36 may exist such that upper leg pusher 16 projects through the opening. Second structural component 34 may constitute, for example, an inner sheet-metal panel and/or one or more window guide rails.

Figure 5:
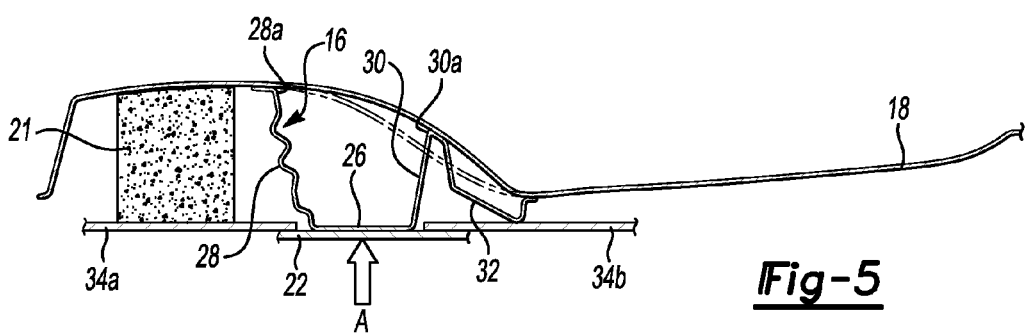
FIG. 5 is a view showing the structure of FIG. 4 in a post-impact condition.

FIG. 5 depicts the condition of upper leg pusher 16 and panel 18 during or after a side impact event involving intrusion into the structure of side body panel 12. Such intrusion results in an inboard-directed force (indicated by arrow A) being applied to structural component 22. Force A urges structural component 22 against reaction surface 26 and they are both forced inboard. Rear pusher wall 28 is purposely engineered to be less stiff than forward pusher wall 30 so that the rear pusher wall yields more than the forward pusher wall. Forward pusher wall 30 therefore maintains a larger portion of its pre-impact length than does rear pusher wall 28, and therefore the location 30a is forced inboard a greater distance than the location 28a where rear pusher wall 28 contacts the panel 18. The more forward location 30a is therefore forced inboard relatively early in the side impact event. In comparison, the less-stiff rear pusher wall 28 yields or deforms so that the location 28a at which it contacts panel section 18a is not urged inboard as far as the location 30a.

Figure 6:
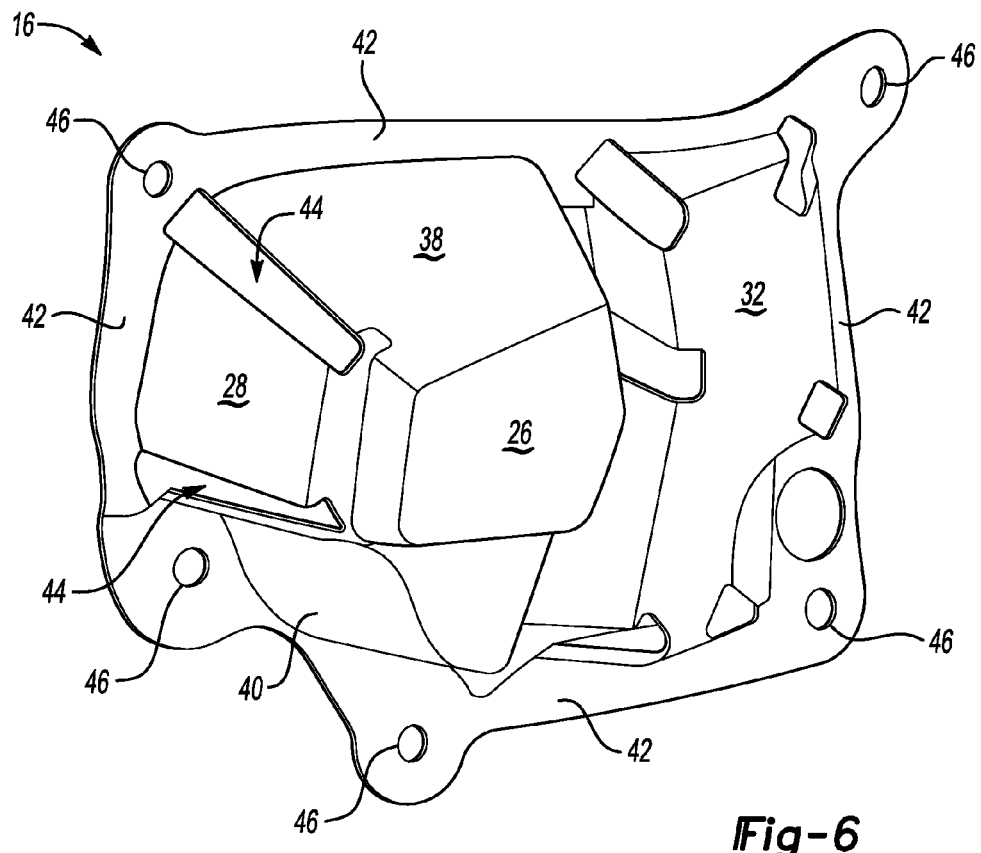
FIG. 6 is a perspective view of a thigh pusher.

An upper leg pusher may be of any shape necessary to meet packaging requirements inside of body side panel 12. In the FIG. 6 embodiment, for example, pusher 16 further comprises an upper pusher wall 38, a lower pusher wall 40, and a peripheral flange 42 with holes 46 located as necessary to secure the pusher to interior panel 18.

Upper leg pusher 16 may further comprise a secondary reaction surface 32 offset from longitudinally and/or vertically from reaction surface 26 so as to be positioned between panel 18 and second structural component 34.

Slots 44 may be formed at locations in the pusher walls to create the desired variation in stiffness between rear pusher wall 28 and forward pusher wall 30. Slots 44 are formed on or adjacent to rear pusher wall 28 and thereby reduce the stiffness in that area of the pusher 16. The variation in the respective stiffnesses of the pusher walls results in rear pusher wall 28 being a lower-stiffness portion and the forward pusher wall 30 being a higher-stiffness portion, relative to one another. Any appropriate known method (or combination of methods) for creating variations in stiffness over the vertical and/or longitudinal dimensions of pusher 16 may be employed. Such methods may include variations in material thickness and/or properties, stiffening ribs, holes, etc.

Figure 7:
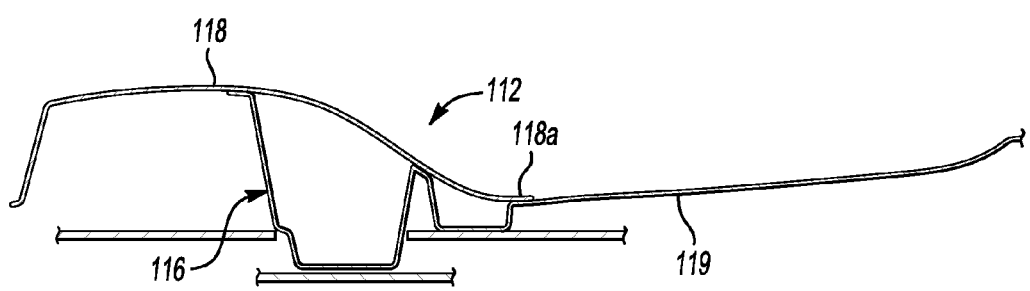
FIG. 7 is a view similar to FIG. 4 showing a second embodiment of a thigh pusher.

FIG. 7 illustrates a second embodiment of a body side panel 112 in which pusher 116 is formed integrally with a second interior panel 119. A first interior panel 118 has a forward-most edge 118A that overlaps with second interior panel 119 as shown. This second embodiment may have advantages in terms of manufacturability and ease of assembly of the overall side panel structure.

FIG. 7 illustrates a second embodiment of a body side panel 112 in which pusher 116 is formed integrally with a second interior panel 119. A first interior panel 118 has a forward edge 118A that overlaps with second interior panel 119 as shown. This second embodiment may have advantages in terms of manufacturability and ease of assembly of the overall side panel structure.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. Motor vehicle structure comprising:
   a panel for positioning outboard of a seat in a vertical orientation;
   a structural component outboard of the panel; and
   a pusher between the structural component and the panel and having a lower-stiffness portion adjacent to a first panel location and a higher-stiffness portion adjacent to a second panel location, the first panel location disposed further inboard than the second panel location.

2. The structure of claim 1 wherein the first panel location is outboard of an upper thigh position of the seat, and the second panel location is forward of the first panel location.

3. The structure of claim 1 wherein the panel is a portion of a vehicle door and the structural component is a side impact beam.

4. The structure of claim 1 wherein the panel comprises a storage pocket adjacent a lower edge thereof, and the second panel location forms a recessed surface above the storage pocket.

5. The structure of claim 1 wherein the panel comprises an arm rest, and the first panel location is below the arm rest.

6. The structure of claim 1 further comprising:
a second structural component between the structural component and the panel and having an opening formed therein, the pusher projecting through the opening to position a reaction surface of the pusher adjacent to the structural component.

7. The structure of claim 1 wherein the pusher comprises:
a reaction surface adjacent to the structural component;
a first flange contacting the panel at the first panel location;
a first pusher wall extending between the reaction surface and the first flange;
a second flange contacting the panel at the second panel location; and
a second pusher wall extending between the reaction surface and the second flange, the second pusher wall being less stiff than the first pusher wall.

8. The structure of claim 1 wherein the pusher is formed integrally with a second panel, the second panel extending forward of a forward-most edge of the panel.

9. Motor vehicle side structure comprising:
a panel for positioning adjacent to a seat with a rear section of the panel aligned with an upper thigh position of the seat and a forward section of the panel offset outboard relative to the rear section;
a structural component outboard of the panel; and
a pusher between the structural component and the panel and having a lower-stiffness portion adjacent to the rear section and a higher-stiffness portion adjacent to the forward section.

10. The motor vehicle side structure of claim 9 wherein the panel is a portion of a door.

11. The motor vehicle side structure of claim 9 wherein the forward section forms a recessed area above a storage pocket.

12. The motor vehicle side structure of claim 9 further comprising:
a second structural component between the structural component and the panel and having an opening formed therein, the pusher projecting through the opening to position a reaction surface of the pusher adjacent to the structural component.

13. The motor vehicle side structure of claim 9 wherein the pusher comprises:
a reaction surface adjacent to the structural component;
a first flange in planar contact with an outboard surface of the rear section;
a first pusher wall extending between the outboard surface and the first flange;
a second flange in planar contact with an outboard surface of the forward section; and
a second pusher wall extending between the outboard surface and the second flange, the second pusher wall being less stiff than the first pusher wall.

14. The motor vehicle side structure of claim 9 wherein the pusher is mounted to the panel.

15. The motor vehicle side structure of claim 9 wherein the pusher is formed contiguously/integrally with a second panel, the second panel extending forward of the panel.

16. A motor vehicle door comprising:
a panel adapted for positioning outboard of a seat with a rear section of the panel directly outboard of an upper thigh position of the seat, and a forward section of the panel further outboard than the rear section; and
a pusher outboard of the panel and having a relatively low stiffness adjacent to the rear section and a relatively high stiffness adjacent to the forward section.

17. The door of claim 16 wherein the forward section forms a recessed area above a storage pocket.

18. The door of claim 16 further comprising:
a first structural component outboard of the panel; and
a second structural component between the first structural component and the panel and having an opening formed therein, the pusher projecting through the opening to position a reaction surface of the pusher adjacent to the first structural component.

19. The door of claim 18 wherein the pusher comprises:
a reaction surface adjacent to the first structural component;
a first flange contacting an outboard surface of the rear section;
a first pusher wall extending between the reaction surface and the first flange;
a second flange contacting an outboard surface of the forward section; and
a second pusher wall extending between the reaction surface and the second flange, the second pusher wall being less stiff than the first pusher wall.

20. The door of claim 16 wherein the pusher is formed integrally with a second panel, the second panel extending forward of the panel.

* * * * *